United States Patent
Zolnowsky et al.

(10) Patent No.: US 8,930,894 B2
(45) Date of Patent: Jan. 6, 2015

(54) METHOD AND SYSTEM FOR EXECUTING AN EXECUTABLE FILE

(75) Inventors: John E. Zolnowsky, Milpitas, CA (US); George R. Cameron, Santa Cruz, CA (US); Blake A. Jones, Oakland, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1636 days.

(21) Appl. No.: 12/247,797

(22) Filed: Oct. 8, 2008

(65) Prior Publication Data

US 2010/0088496 A1    Apr. 8, 2010

(51) Int. Cl.
 G06F 9/44   (2006.01)
 G06F 17/30  (2006.01)
 G06F 9/445  (2006.01)

(52) U.S. Cl.
 CPC ............ *G06F 17/30115* (2013.01); *G06F 8/67* (2013.01)
 USPC .......................................... 717/111; 717/110

(58) Field of Classification Search
 None
 See application file for complete search history.

(56) References Cited

U.S. PATENT DOCUMENTS

| | | | |
|---|---|---|---|
| 5,313,631 A * | 5/1994 | Kao ....................................... 1/1 |
| 6,275,830 B1 * | 8/2001 | Muthukkaruppan et al. .......... 1/1 |
| 6,536,034 B1 * | 3/2003 | Nassor ........................... 717/110 |
| 7,146,607 B2 * | 12/2006 | Nair et al. ...................... 717/151 |
| 7,962,587 B2 | 6/2011 | Tripathi |
| 2006/0037003 A1 * | 2/2006 | Long et al. .................... 717/127 |
| 2009/0089537 A1 | 4/2009 | Vick et al. |

* cited by examiner

*Primary Examiner* — Lewis A Bullock, Jr.
*Assistant Examiner* — Christine Dang
(74) *Attorney, Agent, or Firm* — Osha Liang LLP

(57) ABSTRACT

A method for executing an executable file. The method includes executing instructions in the executable file by a first process, receiving a write request from a second process to write to the executable file, generating an anonymous file from the executable file in response to the write request, executing the anonymous file by the first process, and accessing the executable file by the second process.

11 Claims, 7 Drawing Sheets

METHOD AND SYSTEM FOR EXECUTING AN EXECUTABLE FILE

BACKGROUND

A typical computer system includes hardware (e.g., processor(s), memory, etc.) and software (e.g., operating system, user-level applications, etc.). The hardware includes functionality to execute the instructions defined in the software. The combination of the hardware and the software allows the user to perform various tasks, such as play games, perform word processing applications, perform geological modeling of a region, and/or perform other such tasks.

Software on a computer system is composed of one or more files. Each file is divided into pages containing instructions. The instructions may be executed by a processor. Specifically, in order to execute the instructions of a page, the page is loaded into main memory. From main memory, the instructions from the page are obtained and executed.

SUMMARY

In general, in one aspect, the invention relates to a method for executing an executable file. The method includes executing instructions in the executable file by a first process, receiving a write request from a second process to write to the executable file, generating an anonymous file from the executable file in response to the write request, executing the anonymous file by the first process, and accessing the executable file by the second process.

In general, in one aspect, the invention relates to a method for executing an executable file. The method includes executing instructions in the executable file by a first process, initiating a page removal from main memory to remove a page of a plurality of pages of the executable file from the main memory, generating an anonymous file from the executable file in response to the page removal, and continuing to execute the anonymous file by the first process.

In general, in one aspect, the invention relates to a computer readable medium, which includes computer readable program code embodied in the computer readable medium. The computer readable program code causes a computer system to execute instructions in an executable file by a first process, receive a write request from a second process to write to the executable file, generate an anonymous file from the executable file in response to the write request, execute the anonymous file by the first process, and access the executable file by the second process.

Other aspects of the invention will be apparent from the following description and the appended claims.

DETAILED DESCRIPTION

Figure 1:
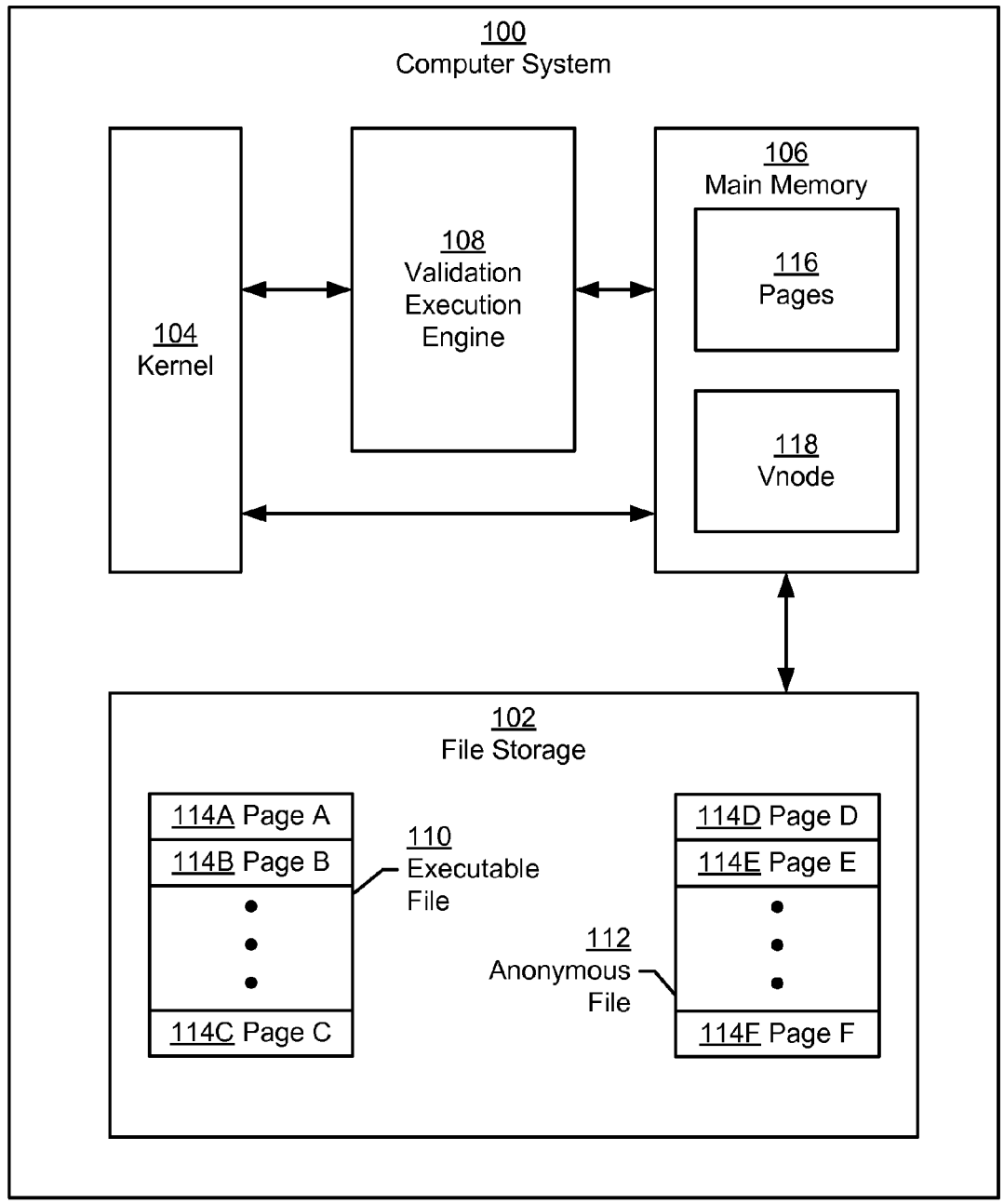
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for executing an executable file. Specifically, embodiments of the invention allow for a first process to execute instructions of the executable file in a system in which a second process may modify the executable file while the first process is executing. Specifically, embodiments of the invention generate an anonymous file from the executable file while the first process is executing. The first process may switch to executing the instructions in the anonymous file without interruption to the first process. The anonymous file is a copy of the executable file prior to any modification by the second process. Because the first process switches the execution to the anonymous file, the executable file may be modified by the second process without affecting the execution of the first process.

FIG. 1 shows a schematic diagram of a computer system (100) for validated execution in accordance with one or more embodiments of the invention. As shown in FIG. 1, the computer system (100) includes file storage (102), a kernel (104), main memory (106), and a validated execution engine (108) in accordance with one or more embodiments of the invention.

The file storage (102) is any type of storage unit for storing files. For example, the file storage (102) may include main memory, an auxiliary data store, such as disk or flash memory, or any other storage unit for data. In one or more embodiments of the invention, the file storage (102) is accessible by multiple processes. For example, one process may be configured to modify the executable file (110) (discussed below) while another process is executing the executable file (110). The processes may be on the same or different computers as discussed below.

In one or more embodiments of the invention, the file storage (102) stores executable files (110) for a program. In one or more embodiments of the invention, the executable files (110) include the instructions to execute the program. For example, the executable files (110) may include program files and library files. Program files are files that include instructions that are executed to perform the functions of the program. Library files include instructions and data that are common to multiple programs. Specifically, library files may be shared by multiple programs (not shown).

In addition to executable files (110), the file storage may also include functionality to store an anonymous file(s) (112). An anonymous file(s) (112) is a copy of the executable file (110) when the executable file (110) is obtained by a process for execution. By retaining a copy of the executable file (110) in an anonymous file (112), a process can continue executing the original copy of the executable file obtained. In one or more embodiments of the invention, the anonymous file (112) is anonymous because the address of the file cannot be identified using standard file system interfaces, such as "ls" to list the contents of a directory, "rm" to remove a file, "mv" to move a file, and other commands. Namely, in order to use an anonymous file, the process already has a reference to the source of the anonymous file.

In one or more embodiments of the invention, each file (e.g., executable file (110), anonymous file (112)) in the file storage (102) is logically divided into multiple pages (114A-F). In one or more embodiments of the invention, a page (114A-F) corresponds to a fixed size of memory that is contiguous when referenced using a physical memory address and a virtual memory address. In one or more embodiments of the invention, the page (114A-F) is the smallest unit of data to be allocated by an operating system for a program.

In one or more embodiments of the invention, the pages (114A-F) of the anonymous file (112) in the file storage (102) include only the pages (116) that are evicted from main memory (106) (discussed below). Specifically, when a page corresponding to the anonymous file (112) is removed from main memory (106) to make room for another page, the page (114A-F) is added to the file storage (102). Thus, the page of the anonymous file (112) may not exist in the file storage (102) prior to the removal from main memory (106).

Continuing with FIG. 1, the computer system (100) includes a kernel (104) in accordance with one or more embodiments of the invention. The kernel (104) includes functionality to provide the basic services for the computer system (100). Specifically, the kernel (104) is a component of the operating system of the computer system (100) that manages the resources available on the computer system (100). For example, the kernel (104) may include a manager for managing processes, a scheduler for determining which process to execute, and other such components.

In one or more embodiments of the invention, the kernel (104) includes functionality to ensure that the executable file is verified prior to execution of the executable file and to ensure that the process executing the executable file executes the validated version of the executable file.

In one or more embodiments of the invention, the main memory (106) corresponds to memory accessible by one or more processors of the computer system. The main memory (106) includes functionality to store pages (116) and at least one vnode (118).

In one or more embodiments of the invention, the pages (116) may include pages of the executable file (110) or pages of the anonymous file (112). Specifically, the pages (116) correspond to pages from the original copy of the executable file (110) as obtained by a process for execution.

In one or more embodiments of the invention, a vnode (118) stores metadata about a file. The vnode (118) may include information about the number of processes that reference the file, the number of processes that are writing to the file, number of locks for writing to the file, references to pages of the file, etc. A vnode (118) for the executable file (110) (i.e., executable file vnode) may include references to pages (116) in main memory (106) and to the pages (114A-F) of the executable file (110) in the file storage (102). The vnode (118) may also include instructions for when to create the anonymous file (112). A vnode (118) for the anonymous file (112) (i.e., anonymous file vnode) may include references to pages (116) in main memory after the anonymous file (112) is created as well as a reference to the pages (114A-F) of the anonymous file (112) in the file storage (102).

Continuing with FIG. 1, the validation execution engine (108) includes functionality to validate executable files. Moreover, the validation execution engine (108) may further include functionality to generate the anonymous file (112). In one or more embodiments of the invention, the validation execution engine (108) includes a validation daemon (not shown). In one or more embodiments of the invention, the validation daemon is a background process that includes functionality to receive a call from the kernel to validate the file, and to subsequently validate the file. Specifically, the validation daemon may start execution when the computer system (100) is powered up and execute without user intervention.

The computer system (100) shown in FIG. 1 may include multiple computers. For example, the computer system (100) may include a first computer and a second computer. A computer is any type of physical or virtual device that includes functionality to process instructions. For example, a computer may be a physical computing device, such as one or more servers, a single computing device (e.g., a personal computer, a mobile device, a workstation computer), a node in a distributed computer system, or any other type of physical computing device. The first computer may be connected to the second computer via a wired and/or wireless communication. For example, the first computer may be connected to the second computer via a network (e.g., a local area network (LAN), a wide area network (WAN) such as the Internet, or any other similar type of network) or via a direct connection.

The second computer may include remote memory in accordance with one or more embodiments of the invention. The remote memory may include functionality to store a portion of the file storage that includes the executable file (110). Specifically, the second computer may include functionality to send the executable file (110) to the first computer.

The first computer may include functionality to execute the executable file. In particular, the first computer may include functionality to validate the executable file (110) and generate the anonymous file (112). In such a scenario, the first computer may include the kernel (104), the validated execution engine (108), and the main memory (106) shown in FIG. 1. The first computer may also include the portion of the file storage (102) that includes the anonymous file (112).

Rather than physical computer systems, each computer system (e.g., first computer system, second computer system) may be a collection of computing resources. For example, each computer system may be a zone in a zone environment. The zone environment in accordance with one or more embodiments of the invention is discussed in detail in commonly owned U.S. application Ser. No. 11/953,839, entitled "Method and System for Enforcing Resource Constraints for Virtual Machines across Migration," in the names of Sunay Tripathi, the contents of which is hereby incorporated by reference in their entirety. In the zone environment, the first computer system may be implemented as a non-global zone while the second computer system is implemented as a global zone or a non-global zone.

As another example, the first computer system and the second computer system may execute in a hypervisor environment. The hypervisor environment in accordance with one or more embodiments of the invention is discussed in detail in commonly owned U.S. patent application Ser. No. 11/864,851, entitled "Apparatus and Method for Memory Address Translation Across Multiple Nodes," in the names of Christopher A. Vick, Anders Landin, Olaf Manczak, Michael H. Paleczny, and Gregory M. Wright, the contents of which is hereby incorporated by reference in their entirety. In the hypervisor environment, the first computer system may be implemented as the application domain or the privileged domain. Similarly, the second computer system may be implemented as another application domain or a privileged domain. The computer systems may communicate via the hypervisor. Each domain in the hypervisor environment is allocated separate memory. Specifically, an application domain cannot access the memory of another application domain.

Although not shown in FIG. 1, the computer system (100) may include validation information for validating the executable file (110). The validation information may include manifests in accordance with one or more embodiments of the invention. The manifests provide information about executable files that are registered with the computer. A file is registered with the first computer system when information about the file is known (e.g., by an administrator managing the computer), when the file or program was previously used by the computer, when the file or program was registered with a computer trusted by the computer having the manifest, etc. The manifests may include an identifier, metadata, and a hash value of the file.

The identifier is any type of unique identifier for the file. For example, the identifier may be an alphanumeric character string assigned to the file, a name and version of the program with a file name, the full pathname to the file, a hash value calculated from the file, etc. The metadata may include size of the file, access control lists for accessing the file, owner of the program, a work group developing or owning the program, identifier of the individual or computer used to last modified the program, and other such information.

Similar to the hash value for a page, the hash value of the file provides a unique summary of the file contents. Specifically, the hash value may be used to detect when the contents of the file change, such as from when the file is registered with the first computer system.

The manifests may be stored in different directories in the memory of a computer. For example, a revocation directory may include manifests that identify the programs that cannot be validated because of security vulnerabilities while another directory includes manifests for known programs that can be validated.

Figure 2:
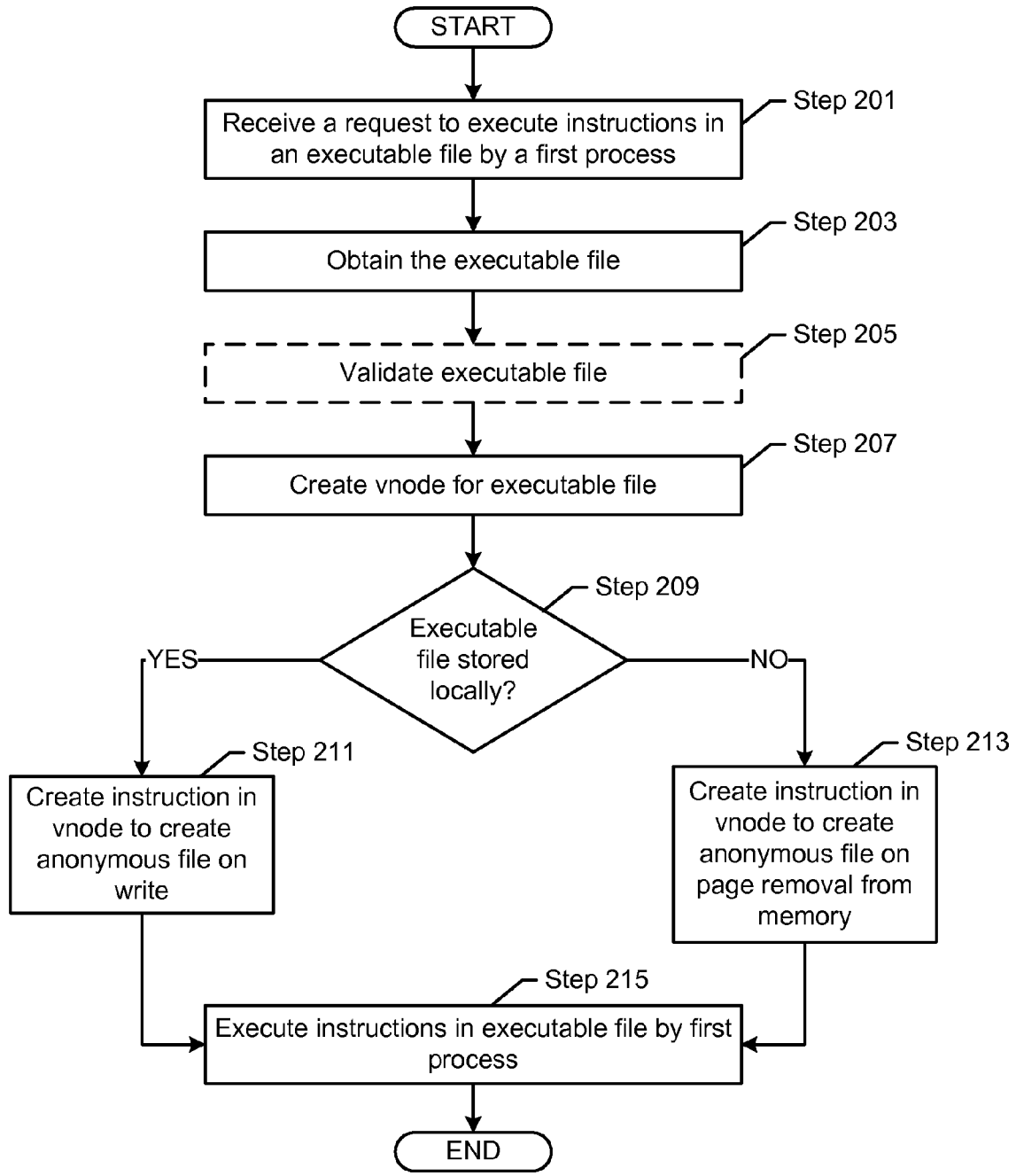
FIGS. 2-4 show flowcharts in accordance with one or more embodiments of the invention.
Figure 3:
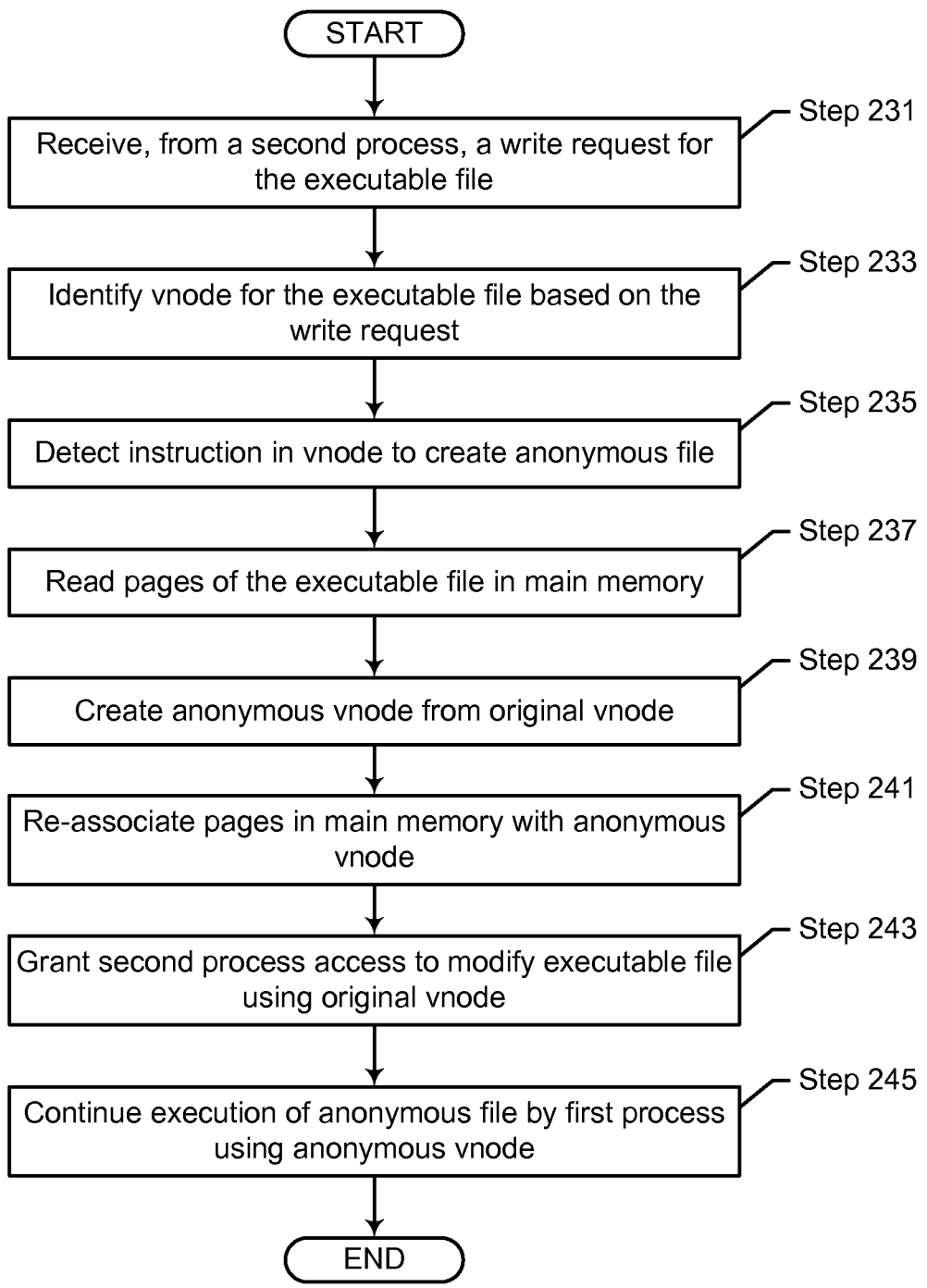
Figure 4:
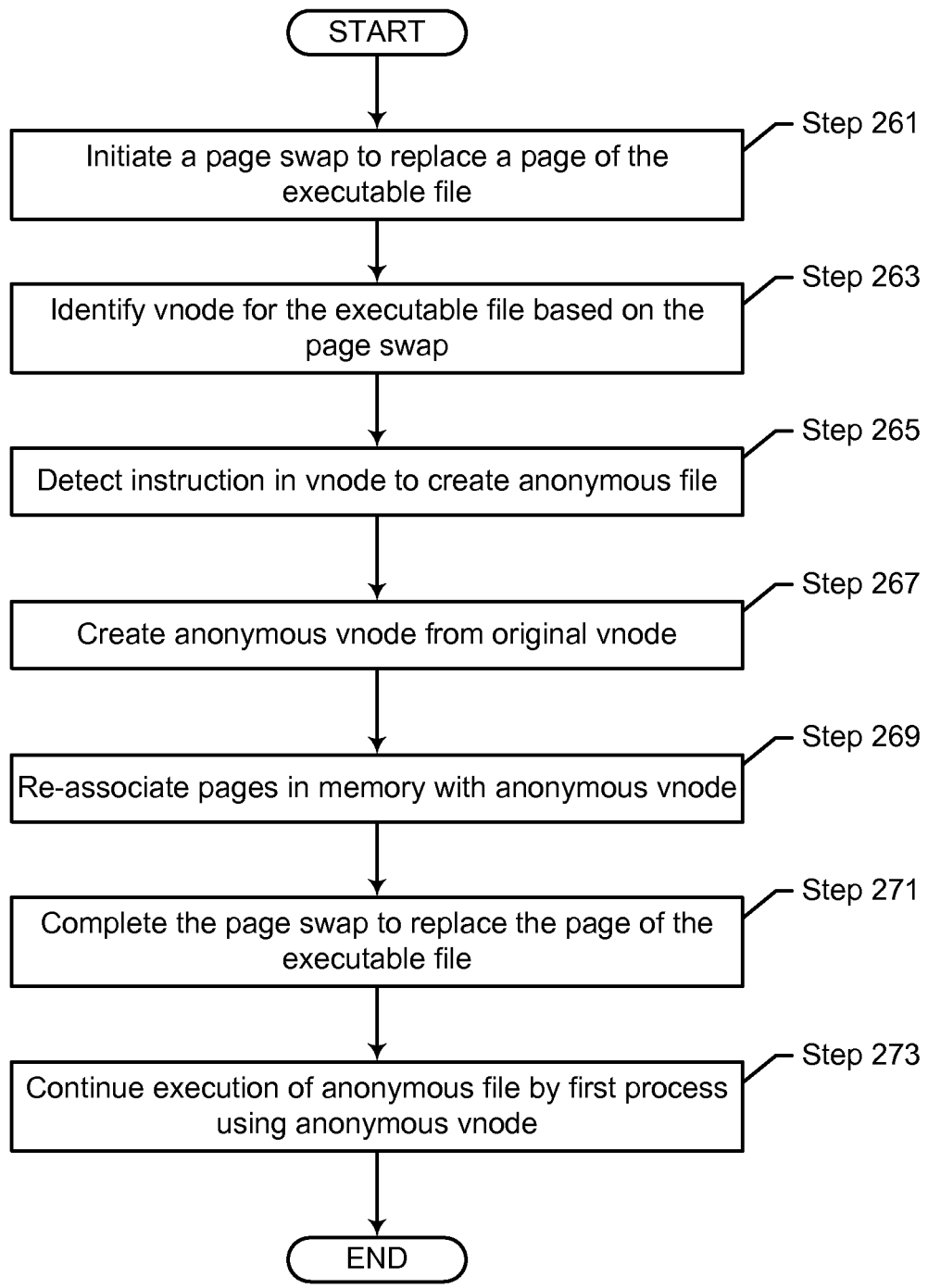

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart for executing an executable file in accordance with one or more embodiments of the invention. As shown in FIG. 2, a request is received to execute instructions in the executable file by a first process (Step 201). Specifically, a first process may identify the executable file that includes the instructions to execute.

Accordingly, the executable file is obtained (Step 203). Obtaining the executable file may include accessing the file storage on the local computer or accessing a file storage on a remote computer. If the file storage on the remote computer is accessed, then obtaining the executable file may include authentication procedures to authenticate the local computer to the remote computer and transferring the data in the executable file from the remote computer to the local computer.

In Step 205, the executable file is optionally validated. Whether the executable file is validated may be dependent on whether the executable file is obtained from a remote computer and the security level of the computer executing the executable file. For example, the validation of the executable file may be performed to ensure that the executable file is not corrupted and does not include viruses or other security threats. The validation may also be performed to ensure that the correct version of the file is executed. Regardless of the reason for validating the executable file, the kernel may request the validation daemon to validate the executable file. In order to validate the files, the digital signature for the file may be obtained. For example, the digital signature may be stored with the file and/or stored in a manifest corresponding to/associated with the file. For example, the digital signature may be stored as metadata with the file. In such a scenario, the digital signature may be encrypted using a private key. In another example, the digital signature may be a simple hash value stored in a secure location in the manifests.

Alternatively, the manifest may be accessed to determine whether the file is registered with the computer. Specifically, the identifier of the file may be used to access the manifests. If a manifest has a matching identifier, then a determination is made whether the digital signature for the file is in the manifest.

After obtaining the digital signature, the file is validated using the digital signature. In one or more embodiments of the invention, the digital signature references a public key certificate for validating the file. Using a cryptographic hash function and the contents of the file, a hash value is created for the file.

The manifests are queried using the hash value for the file. Specifically, a determination is made whether any of the manifests are associated with the hash value for the file. If the hash value is in a manifest located in the revocation directory, the validation of the file may fail. Specifically, because the revocation directory includes manifest entries for files that have security vulnerabilities, when a hash value for the file matches the manifest entry, the file may be deemed to have security vulnerabilities. Thus, for the protection of the computer system, the file may be deemed unsafe to execute. Thus, the file may be considered invalid.

Conversely, the hash value of the file may be compared with manifest entries for files that are considered safe to execute. In such a scenario, if the hash value for the file matches the hash values in the manifests for files that are considered safe to execute, then the file may be deemed safe to use in execution. Thus, the file is considered valid.

Further, the hash value may be compared with the digital signature. Specifically, in cases in which a hash value is encrypted with a private key (e.g., a digital signature) is embedded in the file itself, the hash value is compared with the digital signature in the file. If the digital signature matches the hash value, then the file may be deemed safe to execute. In such a scenario, the file may be deemed valid.

In one or more embodiments of the invention, the result of the validation may be that the file is valid, the file is invalid, or that the file is not validated. If the file is valid, then the loading and execution of the file may proceed. If the file is invalid, the execution of the program may be prevented by the kernel on the first computer system. Specifically, the kernel may create an error message indicating that the file cannot be used in the execution of the program. If the file is not validated, then insufficient information for the validation to succeed exists. In such a scenario, the execution of the program may proceed with limited access to resources on the first computer system. For example, the program may be provided with limited privileges to access data, any networks, etc.

Continuing with FIG. 2, a vnode for the executable file is created (Step 207). Creating the vnode for the executable file may be performed using techniques known in the art. In one or more embodiments of the invention, the vnode is created to include references to each page of the executable file.

In step 209, a determination is made whether the executable file is stored locally. Specifically, a determination is made whether the executable file is obtained from a file storage local to the computer executing the executable file.

In Step 211, if the vnode is stored locally, than an instruction is created in the vnode to create the anonymous file on any write to the executable file. The instruction defines when to create the anonymous file. For executable files that are stored locally, write requests to the executable file are identifiable. Accordingly, the instruction indicates that the anonymous file is created on the first write to the executable file in accordance with one or more embodiments of the invention.

Alternatively, if the executable file is not stored locally, than an instruction is created in the vnode to create the anonymous file on page removal from main memory in accordance with one or more embodiments of the invention (Step 213). For executable files that are not stored locally, write requests to the executable file may not be identifiable. Accordingly, the instruction indicates that the anonymous file is created prior to removing a page of the executable file in accordance with one or more embodiments of the invention. Thus, rather than re-obtaining removed pages from the remote computer, the removed pages are stored in and may be re-obtained from an anonymous file on the local computer.

Alternatively, if the write request to the executable file on the remote computer is identifiable, then the instruction added to the vnode may indicate to create the anonymous file on the first write request to the executable file. In step 217, the instructions in the executable file are executed. Executing instructions in a file may be performed using techniques known in the art.

FIG. 3 shows a flowchart for generating an anonymous file when the executable file is locally stored in accordance with one or more embodiments of the invention. In Step 231, a write request is received from a second process for the executable file. The second process may issue a request to open the file for writing to the file. The request may include an identifier, such as a pathname, of the executable file.

In Step 233, the vnode for the executable file is identified based on the write request. Specifically, the identifier of the file is used to identify the vnode.

In Step 235, before allowing the second process access to the vnode, an instruction in the vnode is detected to create the anonymous file. The instruction may be in the form of a flag. If the instruction is a flag, then the flag may be interpreted by the validated execution engine. Accordingly, the creation of the anonymous file is initiated.

In Step 237, pages of the executable file are read into memory. Because the file is stored locally, some of the pages may not be in main memory. The pages that are not in main memory are read into memory in accordance with one or more embodiments of the invention.

In Step 239, an anonymous vnode is created from the original vnode. In one embodiment of the invention, all or a subset of the contents of the original vnode is copied to create the anonymous vnode. In one embodiment of the invention, the anonymous vnode does not include the reference to the executable file in the file storage. Thus, the anonymous vnode does not reference the copies of the pages of the executable file that are in the file storage. However, the anonymous vnode may include other information about the anonymous file such as the number of references to the anonymous file, number of locks in use, and other such information.

In Step 241, the pages of the executable file in main memory are re-associated with the anonymous vnode. Namely, the anonymous vnode references the pages in main memory. Conversely, the references to the executable file in main memory are removed from the original vnode. Additionally, the reference counts for the number of processes referencing the original vnode may be changed to indicate that only the second process references the original vnode. Thus, the original vnode references the pages of the executable file in the file storage. Because the original vnode references the pages of the executable file in the file storage and the anonymous vnode references only the pages of the executable file in main memory at the time the anonymous vnode is created, the creation of the anonymous vnode results in a copy of the executable file being present in the computer system.

In Step 243, the second process is granted access to modify the executable file using the original vnode. Namely, the copies of the pages of the executable file may be re-obtained from the file storage and stored in main memory. The second process may modify the copies of the pages. Writes to the copies of the pages are written back to the executable file in the file storage.

In Step 245, the execution of the anonymous file is continued by the first process using the anonymous vnode. The first process is provided the reference for the anonymous vnode. Because the anonymous vnode references the original pages of the executable file, the execution by the first process may continue without interruption. Moreover, when a page associated with the anonymous vnode is removed from main memory, the page is added to the file storage. Namely, a new page is created in the file storage. The new page is only able to be referenced by the anonymous vnode in accordance with one or more embodiments of the invention. Therefore, when the anonymous vnode is not referenced by a process, the anonymous vnode and all of the pages referenced by the anonymous vnode may be removed from memory.

When the execution of the anonymous file completes, the number of references to the anonymous file as identified by the vnode is reduced. Namely, when executing the anonymous file completes, the process performing the execution no longer references the anonymous file. Thus, a garbage collector may detect the number of processes accessing the anonymous file using the reference count in anonymous vnode. When the reference count indicates that no process is accessing the anonymous vnode, then the file storage space and main memory used to store the anonymous file and the anonymous vnode may be reclaimed. Namely, the space required to store the anonymous file and anonymous vnode is not required once execution completes. Thus, the space may be used for other data.

FIG. 4 shows a flowchart for creating an anonymous file when the executable file is stored remotely in accordance with one or more embodiments of the invention. In Step 261, a page swap is initiated to replace a page of the executable file. Specifically, the kernel may identify that a page in main memory needs to be replaced based on the amount of storage space available in main memory. Accordingly, the kernel selects a page in memory to replace. The page selected is a page of the executable file.

In Step 263, the vnode for the executable file is identified based on the page swap. In Step 265, an instruction to create an anonymous file is detected in the vnode. Detecting the instruction may be performed as discussed above and in Step 235 of FIG. 3. In Step 267, the anonymous vnode is created from the original vnode.

In Step 269, the pages of the executable file in main memory are re-associated with the anonymous vnode. Namely, the anonymous vnode references the pages in main memory. Conversely, the references to the executable file in main memory are removed from the original vnode. Additionally, the reference counts for the number of processes referencing the original vnode may be changed to indicate that the original vnode is not referenced. Because the executable file is not stored locally, the creation of the anonymous vnode creates a local copy of the executable file.

In Step 271, the page swap is completed to replace the page of the executable file. Namely, because the page of the executable file is now associated with the anonymous vnode, the page of the executable file is stored on a local file storage as a page of the anonymous file. Thus, when the first process requires the replaced page, the page may be obtained from the local file storage.

In Step 273, the execution of the anonymous file is continued by the first process using the anonymous vnode. Continuing execution of the anonymous file may be performed as discussed above and in Step 245 of FIG. 3.

Although not discussed above and in FIGS. 3 and 4, if more than one process is executing the executable file when the anonymous vnode is created, then each process that is executing the executable file before the anonymous vnode is created may switch to executing the anonymous file using the anonymous vnode. For example, consider the scenario in which process 1 and process 2 are both executing the executable file. Accordingly, process 1 and process 2 use the same executable vnode to execute the executable file. Thus, when the anonymous vnode is created, process 1 and process 2 are both switched to using the anonymous vnode for executing the executable file.

Moreover, if the executable file is stored remotely, then multiple anonymous files may be created for the same executable file in accordance with one or more embodiments of the invention. For example, consider the scenario in which process 1 obtains and begins executing the executable file. Before any of the pages of the executable file are removed from main memory, process 2 begins executing the pages of the executable file using the same vnode as process 1. When a page of the executable file is removed from memory, then the vnode referenced by process 1 and process 2 changes to an anonymous vnode. Next, process 3 begins executing the executable file. Because a complete current copy of the executable file may not be stored locally, the executable file may be re-obtained from the remote computer. Accordingly, process 3 begins executing the executable file using another vnode. When a page of the re-obtained executable file is removed from memory, then a second anonymous vnode may be created for process 3. Thus, while process 1 and process 2 are using a first anonymous vnode, process 3 may use a second anonymous vnode.

Alternatively, each process may be required to separately obtain a copy of the executable file from the remote computer. Thus, in the example above, process 2 may obtain a separate copy of the executable file from the remote computer. In such a scenario, three anonymous files may be created, one for each process.

Figure 5A:
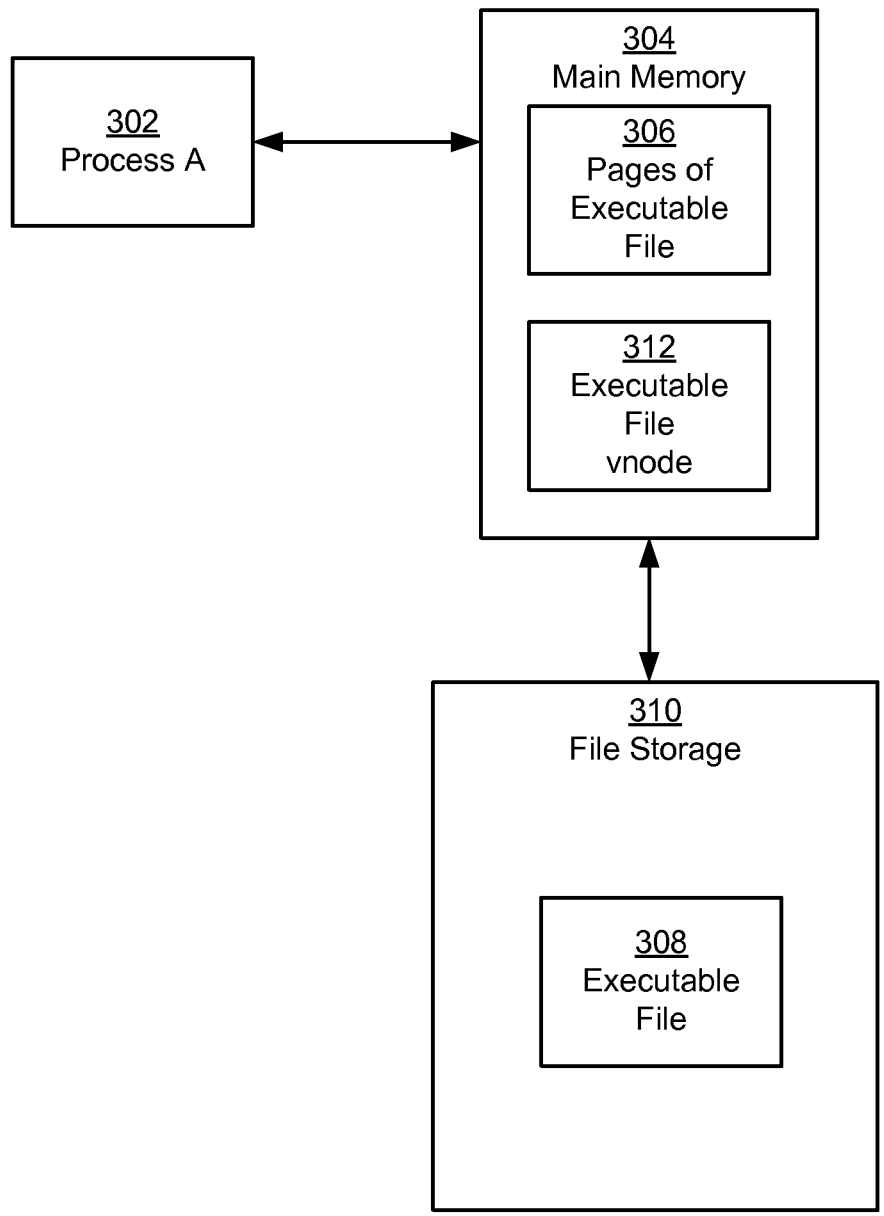
FIGS. 5A-B show an example in accordance with one or more embodiments of the invention.
Figure 5B:
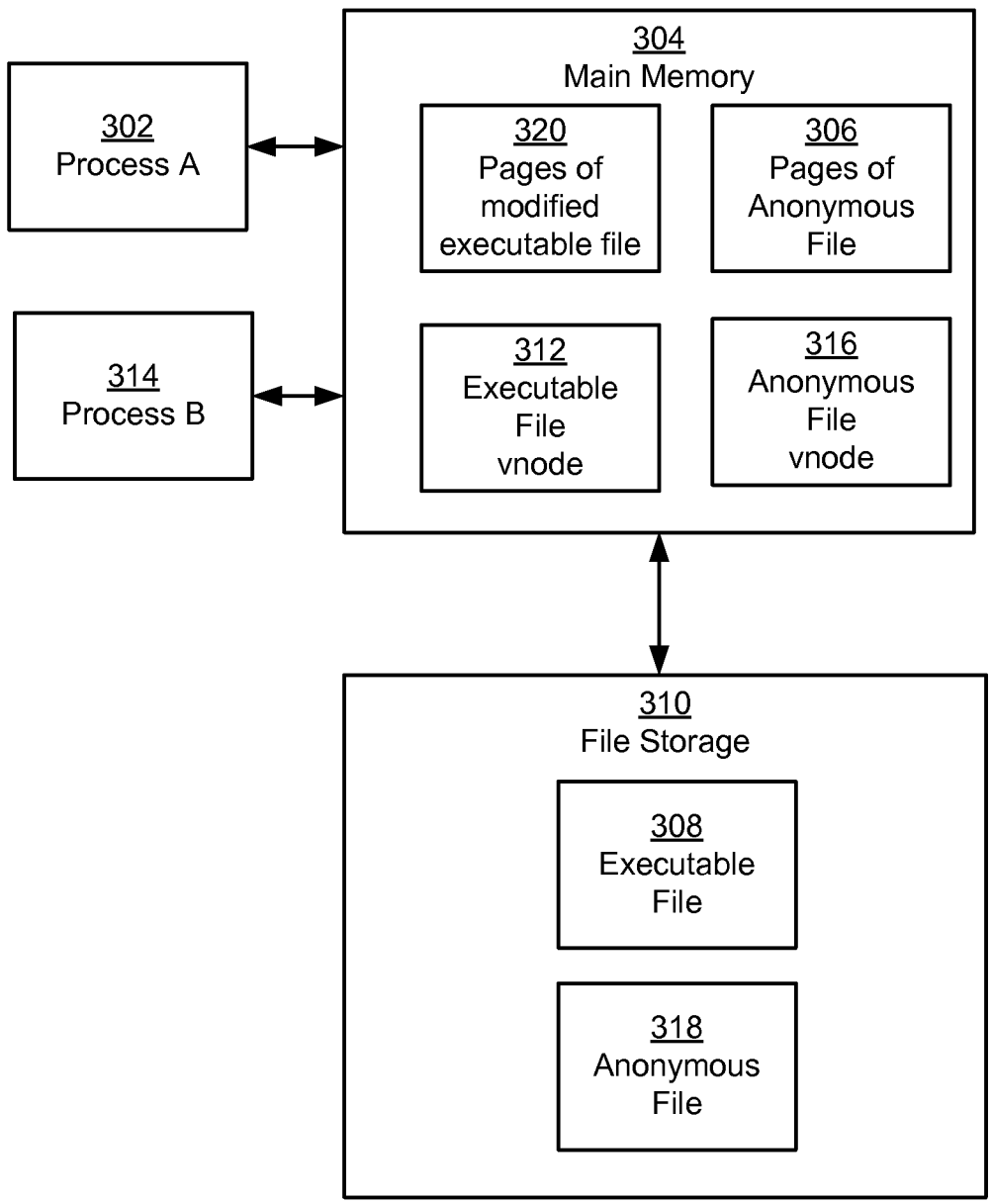

FIGS. 5A-B show an example in accordance with one or more embodiments of the invention. The following example is for explanatory purposes only and not intended to limit the scope of the invention. For the following example, consider the scenario in which process A is executing an executable file. As shown in FIG. 5A, process A (302) accesses main memory (304) to obtain pages of the executable file (306). The pages of the executable file (306) are copies of the pages of the executable file (308) in the file storage (310). The executable file vnode (312) includes the metadata about the executable file. Specifically, the executable file vnode (312) includes an instruction to create an anonymous file on the issuance of a write request.

Continuing in the example, consider the scenario in which process B issues a write request. FIG. 5B shows a schematic diagram of the system after process B (314) issues the write request. As shown in FIG. 5B, when process B (314) issues a write request, an anonymous file vnode (316) is created from the executable file vnode (312). The anonymous file vnode (316) references the original pages of the executable file which are now labeled pages of the anonymous file (306). When pages of the anonymous file (306) are removed from main memory, the pages of the anonymous file (318) are stored in the file storage (310) separately from the executable file (308). Thus, process A (302) may continue processing the original executable file (relabeled the anonymous file (318)), while process B (314) modifies the executable file (308). As process B is modifying the executable file (308), process B (314) may load the pages of the modified file (320) in main memory (304). Thus, after the write request is performed, two distinct versions of the executable file may exist. The first version allows process A (302) to continue execution of the executable file. The second version allows process B (314) to update the executable file.

Figure 6:
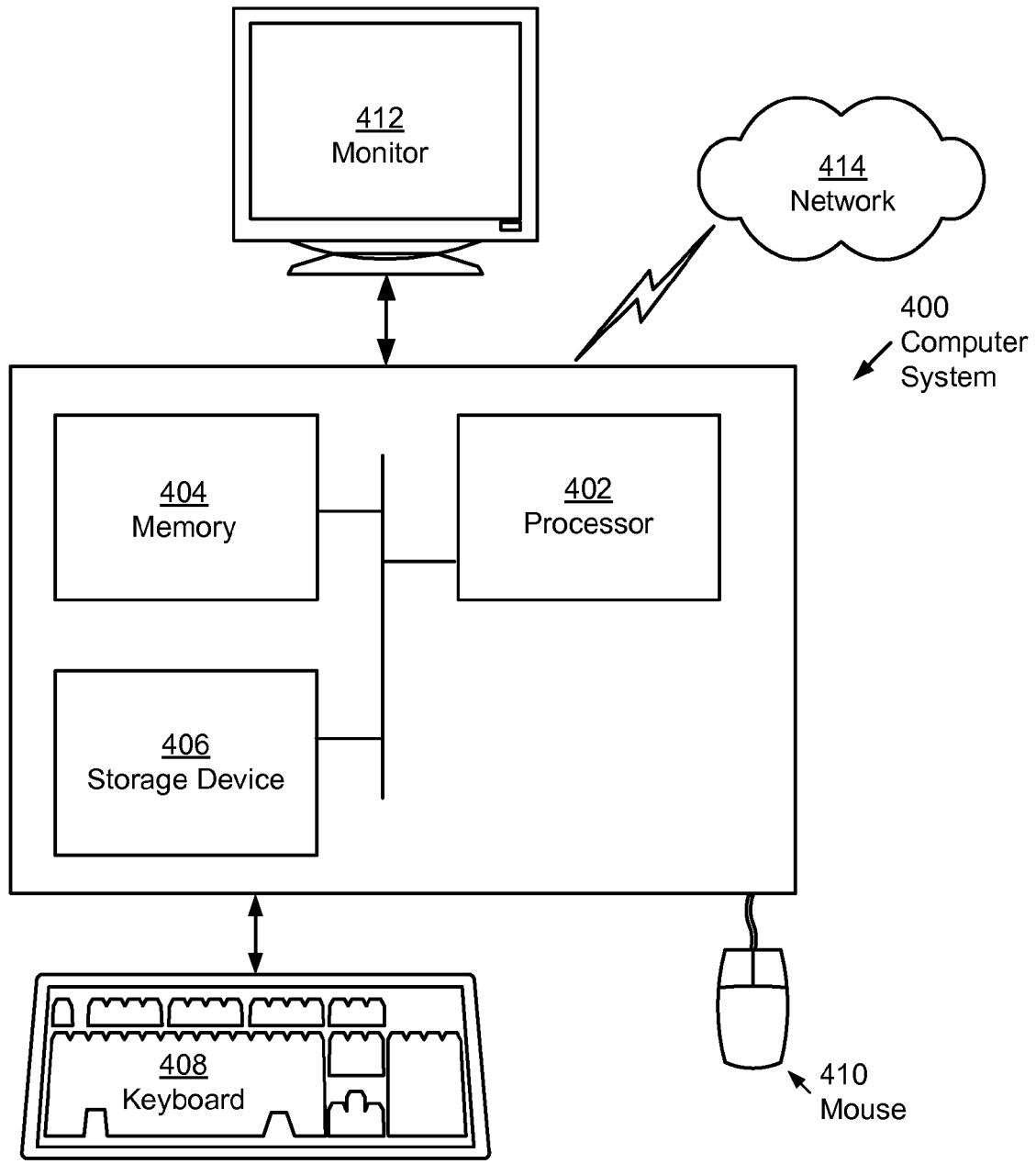
FIG. 6 shows a computer system in accordance with one or more embodiments of the invention.

Embodiments of the invention may be implemented on virtually any type of computer regardless of the platform being used. For example, as shown in FIG. 6, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., main memory, file storage, validated execution engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

Embodiments of the invention provide a method and system for allowing a process to continue executing instructions in the executable file when another process may modify the executable file. Namely, even while another process is modifying the executable file, the first process can continue execution of the version of the executable file that the first process starting executing. Thus, both processes may perform their respective tasks without interruption.

Additionally, by maintaining the original version of the executable file as an anonymous file, when all process that are executing the original version of the file complete execution, the storage space in main memory and on the file storage may be reclaimed through known reclaiming algorithms in accordance with one or more embodiments of the invention. In such embodiments, the old version of the executable file is removed from memory.

Further, in the case in which the executable file is stored remotely, the first process may execute a validated version of the executable file without re-obtaining pages from the remote computer or locking the pages in main memory. Similarly, the remote computer does not need to prevent another process from modifying the pages. Thus, the process on the local computer can execute the original validated version of the executable file independently from the processes on and accessing the remote computer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing an executable file, comprising:
   executing original instructions in the executable file by a first process, wherein the executable file comprises a plurality of pages, and wherein executing instructions in the executable file comprises:
     accessing an original vnode to obtain a reference to a page of the plurality of pages, wherein the original vnode comprises a reference to each page of the plurality of pages in main memory, a reference to the executable file in a file storage, and an instruction defining when to create an anonymous file;
     accessing the page of the plurality of pages using the reference to the page from the original vnode, and
     executing instructions from the page of the plurality of pages while the page is in main memory;
   receiving a write request from a second process to write to the executable file;
   generating, from the executable file in response to the write request, the anonymous file comprising the original instructions based on the instruction in the original vnode defining when to create the anonymous file;
   executing the original instructions in the anonymous file by the first process;
   modifying, after generating the anonymous file, the executable file by the second process to create modified instructions in the executable file; and
   reclaiming file storage space storing the anonymous file after executing the anonymous file by the first process completes.

2. The method of claim 1, wherein generating the anonymous file comprises:
   generating an anonymous vnode from the original vnode;
   removing an association of the original vnode with each page of the plurality of pages in main memory; and
   re-associating each page of the plurality of pages with the anonymous vnode to create a plurality of re-associated pages, wherein executing the anonymous file comprises accessing at least one of the plurality of re-associated pages of the anonymous vnode.

3. The method of claim 2, wherein generating the anonymous file further comprises:
   loading each page of the plurality of pages into the main memory prior to re-associating each page of the plurality of pages.

4. The method of claim 2, wherein each page of the plurality of pages in main memory is re-associated with the anonymous vnode.

5. The method of claim 2, further comprising:
   detecting a number of processes accessing the anonymous file based on the anonymous vnode,
   wherein file storage space is reclaimed when the number of processes is equal to zero.

6. The method of claim 1, wherein accessing the executable file by the second process comprises:
   loading a page of the executable file into main memory; and
   writing to the page of the executable file.

7. A non-transitory computer readable medium comprising computer readable program code embodied therein for causing a computer system to:
   execute original instructions in an executable file by a first process, wherein the executable file comprises a plurality of pages, and wherein executing instructions in the executable file comprises:
     accessing an original vnode to obtain a reference to a page of the plurality of pages, wherein the original vnode comprises a reference to each page of the plurality of pages in main memory, a reference to the executable file in a file storage, and an instruction defining when to create an anonymous file;
     accessing the page of the plurality of pages using the reference to the page from the original vnode, and
     executing instructions from the page of the plurality of pages while the page is in main memory;
   receive a write request from a second process to write to the executable file;
   generate, from the executable file in response to the write request, the anonymous file comprising the original instructions based on the instruction in the original vnode defining when to create the anonymous file;
   execute the original instructions in the anonymous file by the first process; and
   modify, after generating the anonymous file, the executable file by the second process to create modified instructions in the executable file,
   wherein file storage space storing the anonymous file is reclaimed after executing the anonymous file by the first process completes.

8. The non-transitory computer readable medium of claim 7, wherein generating the anonymous file comprises:
   generating an anonymous vnode from the original vnode;
   removing an association of the original vnode with each page of the plurality of pages in main memory; and
   re-associating each page of the plurality of pages with the anonymous vnode to create a plurality of re-associated pages, wherein executing the anonymous file comprises accessing at least one of the plurality of re-associated pages of the anonymous vnode.

9. The non-transitory computer readable medium of claim 8, wherein generating the anonymous file further comprises:
   loading each page of the plurality of pages into the main memory prior to re-associating each page of the plurality of pages.

10. The non-transitory computer readable medium of claim 8, wherein each page of the plurality of pages in main memory is re-associated with the anonymous vnode.

11. The non-transitory computer readable medium of claim 7, wherein accessing the executable file by the second process comprises:
   loading a page of the executable file into main memory; and
   writing to the page of the executable file.

* * * * *